United States Patent

Kraaij

[11] Patent Number: 6,162,557
[45] Date of Patent: Dec. 19, 2000

[54] METHOD FOR DETERMINING THE FLOW RATE OF REACTANTS IN EACH CELL OF AN ELECTROCHEMICAL CELL STACK

[75] Inventor: Gerard Jan Kraaij, Oude Niedorp, Netherlands

[73] Assignee: Stichting Energieonderzoek Centrum Nederland, Le Petten, Netherlands

[21] Appl. No.: 09/180,291

[22] PCT Filed: May 1, 1997

[86] PCT No.: PCT/NL97/00247

§ 371 Date: Nov. 5, 1998

§ 102(e) Date: Nov. 5, 1998

[87] PCT Pub. No.: WO97/42674

PCT Pub. Date: Nov. 13, 1997

[30] Foreign Application Priority Data

May 6, 1996 [NL] Netherlands ............................ 1003042

[51] Int. Cl.[7] .................................................. H01M 8/04
[52] U.S. Cl. ................................ 429/17; 429/13; 429/24; 429/12
[58] Field of Search ................................ 429/13, 14, 15, 429/17, 50, 103, 105, 24, 19

[56] References Cited

U.S. PATENT DOCUMENTS 3,980,496  9/1976  Ludwig et al. ........................ 429/103
4,378,385  3/1983  Hughes ................................. 427/126.3
5,479,700  1/1996  Nachlas et al. ........................... 29/825
5,547,494  8/1996  Prasad et al. ............................... 95/54

FOREIGN PATENT DOCUMENTS

| 1571932 | 1/1971 | Germany . |
| 60-056374 | 8/1985 | Japan . |
| 60-241664 | 4/1986 | Japan . |
| 61-051772 | 7/1986 | Japan . |
| 61-051773 | 7/1986 | Japan . |
| 63-195969 | 7/1986 | Japan . |
| 8-007911 | 1/1996 | Japan . |
| 8-031439 | 2/1996 | Japan . |

Primary Examiner—Maria Nuzzolillo
Assistant Examiner—Raymond Alejandro
Attorney, Agent, or Firm—Young & Thompson

[57] ABSTRACT

Method for determining the utilization of a reactant at the anode side or cathode side of a fuel cell. To this end a low flow with high utilization is applied at the side to be measured and an appreciable flow with low utilization is applied at the other side. A table is compiled in which the relationship between the Nernst voltage under the outlet conditions, such as the temperature, and the utilization of the reactant to be measured is incorporated. Cell voltage is then measured at the outlet and is equated to the Nernst voltage. The utilization can be determined from the table. This method can be used for determination of the flow rate and the flow distribution in a stack of electrochemical cells.

12 Claims, 2 Drawing Sheets

METHOD FOR DETERMINING THE FLOW RATE OF REACTANTS IN EACH CELL OF AN ELECTROCHEMICAL CELL STACK

CROSS-REFERENCE TO RELATED APPLICATION

This is the 35 USC 371 national stage of international application PCT/NL97/00247 filed on May 1, 1997, which designated the United States of America.

FIELD OF THE INVENTION

The present invention relates to a method for determining the utilisation of a reactant at the anode side or cathode side of an electrochemical cell.

BACKGROUND OF THE INVENTION

Because the utilisation of the reactant concerned is known, the flow rate of said reactant can be determined. This is important for diverse applications.

In particular, a method of this type can be used to determine the relationship between the flow rates in the various cells of a stack of fuel cells.

After all, in the case of a cell stack it is important that all cells make approximately the same contribution to the total voltage. If one of the cells functions less well, this immediately has an effect on the entire stack, in particular if, as is customary, it is a matter of electric current in a serial circuit.

In the case of the production of electrochemical cells, and more particularly fuel cells, on an industrial scale, the flow resistance of the separator plates and/or other constructions for feeding in and removing the reactants will be different, inter alia because of manufacturing tolerances, creep and corrosion. If reactants are introduced in parallel into a cell stack, then, with the manifolding used, all the gas introduced will be fed over the first cell and that portion for said first cell will be removed at the latter, all the gas minus the gas removed for the first cell will be fed over the second cell, etc. The same applies for the outlet side. This means that there are always different flow conditions. Because in the case of a serial circuit the electric current which passes through each cell is the same, there will be more polarisation in a cell where an inadmissible restriction in the flow occurs, as a result of which the cell voltage falls.

Methods are proposed in the prior art for determining the hydraulic resistance per cell using conventional flow meters at the output for reactants at the anode and the cathode and measuring the pressure drop and in this way investigating whether inadmissible deviations between cells occur during production or operation.

A method of this type is suitable only for a single cell and is unsuitable for measuring during operation of a fuel cell stack. The effect of, for example, manifolding on cells cannot be measured by this method. This applies in particular if a fuel cell stack is operated at higher temperatures or under other conditions which deviate from ambient conditions. This means that a measurement under operating conditions is not possible and, therefore, does not yield results which are adequately in accord with the operating conditions.

Furthermore, the measurement described above is complex. As a result, during mass production of electrochemical cells one will not be readily inclined to conduct such measurement as standard for every cell.

SUMMARY OF THE INVENTION

The aim of the present invention is to avoid the disadvantages described above and to provide a method with which the flow rate of a reactant can be determined per cell in a simple manner.

This aim is achieved by feeding through a high flow reactant of known composition at the cathode or anode side, feeding through a low flow reactant of known composition at the anode or cathode side, setting a low average current density in the cell, determining the cell voltage, providing a table in which the relationship between the Nernst voltage under the outlet conditions of said cell, such as the temperature, and the utilisation of the gas with low flow is incorporated, equating the Nernst voltage and the cell voltage and determining the utilisation from the table.

The ingoing flow rate of the low flow reactant is determined by determining the inverse of the utilisation and multiplying by the set electric current and dividing by the Faraday constant (F=96485 C/mol), the number of electrons involved in the overall reaction and the fraction of the molecule in the reactant for which the utilisation has been determined. The outgoing flow rate of reaction products and unreacted reactant can be calculated from the above by taking account of chemical reactions which occur in the cell and which are dependent on the set current.

The invention is based on the insight that with a relatively low value of the product of the average current density and local electrical resistance, the cell voltage is independent of said average current density and resistance. In practice, under such conditions the cell voltage is essentially dependent on the temperature and the utilisation of the gases supplied. Under such conditions and high utilisation of the reactant to be measured, the current density is high at the cell inlet and low at the cell outlet. An appreciable change in Nernst voltage takes place over the cell. It has been found that because of this very low current density at the outlet, the difference between the cell voltage and the Nernst voltage based on the composition of the outlet gas from this reactant to be measured is very small and in practice the cell voltage and Nernst voltage can be taken to be the same.

The various aspects are on condition that a reactant with low utilisation and appreciable flow is used at the other side of the electrochemical cell. As a result the contribution at the 'other side' of the electrochemical cell of this particular reactant which is not to be measured is indeed known. From the measured cell voltage, less the contribution made by the reactant flow with low utilisation and appreciable flow, it is possible to determine the gas composition of the reactant to be measured at the outlet with the aid of the Nernst equations. To simplify the various aspects, said equations can be saved in a table and displayed.

The high flow reactant preferably has a flow with a utilisation of less than 25% and more particularly less than 10% at the set current density.

The low flow reactant preferably has a flow with a utilisation of greater than 50% and more particularly greater than 75% at the set current density.

The abovementioned product of average current density and local electrical resistance is preferably less than 0.8 V and preferably approximately 0.03 V, whilst the current density at the outlet under these conditions is preferably less than 10 A/m$^2$.

The abovementioned values apply in particular for a fuel cell of the molten carbonate type (MCFC). The method described can, of course, be used for other electrochemical cells with external feed and removal of reactants, in which case the values must be adjusted accordingly.

The subject method can be made even more precise by correcting the table for the actual utilisation of the reactant with high flow.

Since the utilization is proportional to the electric current, which is the same in all cells, and inversely proportional to the ingoing flow rate, the flow rate can be determined in a simple manner following the above.

The method described above can be used in particular for testing a cell stack in operation (albeit under the conditions indicated above). By measuring the various cell voltages, the ingoing flow rate of the reactant to be measured can be determined per cell. In this way it is possible, during production, when the cell stack is bench tested, also to investigate whether a specific cell deviates to an inadmissible extent from the others as a result of production tolerances and/or faults.

Furthermore, on the basis of the above and with the aid of a model which describes the changes in the flow rate and flow characteristics of the reactant as a consequence of the electrochemical reactions, it is possible to calculate the hydraulic behaviour of the cell stack for other operating conditions.

BRIEF DESCRIPTION OF THE DRAWINGS

The invention will now be explained in more detail with reference to a few graphs. In these graphs.

DETAILED DESCRIPTION OF THE INVENTION

The invention will be further expounded below with reference to an MCFC fuel cell stack for which the relationship of the flow rates between the cells is determined at the fuel side. This means that there is an appreciable flow of oxidant with low utilisation. More particularly, the utilisation is less than 10 %. The average current density was 295 A/m$^2$. Under these conditions, the current density at the outlet is less than 10 A/m$^2$. The fuel composition was 64 % $H_2$, 16% $CO_2$ and 20 % $H_2O$. The oxidant comprised 66% air, 28% $CO_2$ and 6% $H_2O$.

It will be clear that it is also possible to determine the flow rates at the oxidant side using the above method and it is also clear that this method can be used for any other electrochemical cell where feed and removal of reactants play a role.

Figure 1:
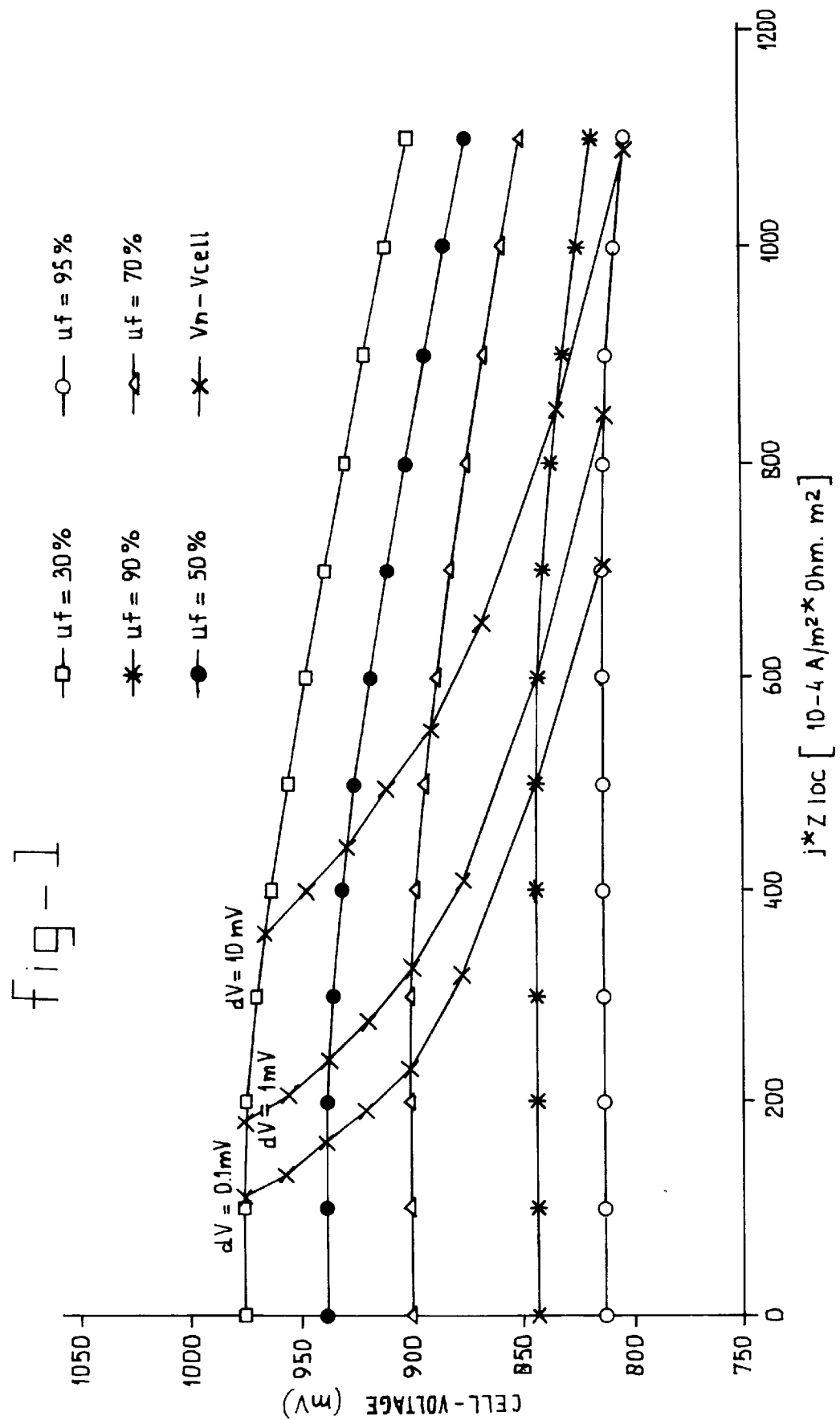
FIG. 1 shows the relationship between cell voltage and the product of average current density and local resistance, utilisation of a reactant respectively.

In FIG. 1 the (virtually) horizontal lines indicate the cell voltage as a function of the product of average current density and local electrical resistance for different fuel utilisation for an MCFC fuel cell stack as described above and an oxidant utilisation of 10%. Furthermore, three lines in FIG. 1 indicate the deviation of the cell-voltage with respect to the Nernst voltage at the outlet, calculated for the gas composition concerned.

It can clearly be seen from this figure that at higher fuel utilisation the difference between cell voltage and Nernst voltage at the outlet is negligible over a broader range of the product of average current density and local electrical resistance. This confirms the premise stated above that the cell voltage is independent of the average current density and local electrical resistance and can be equated to the Nernst voltage at the outlet.

Figure 2:
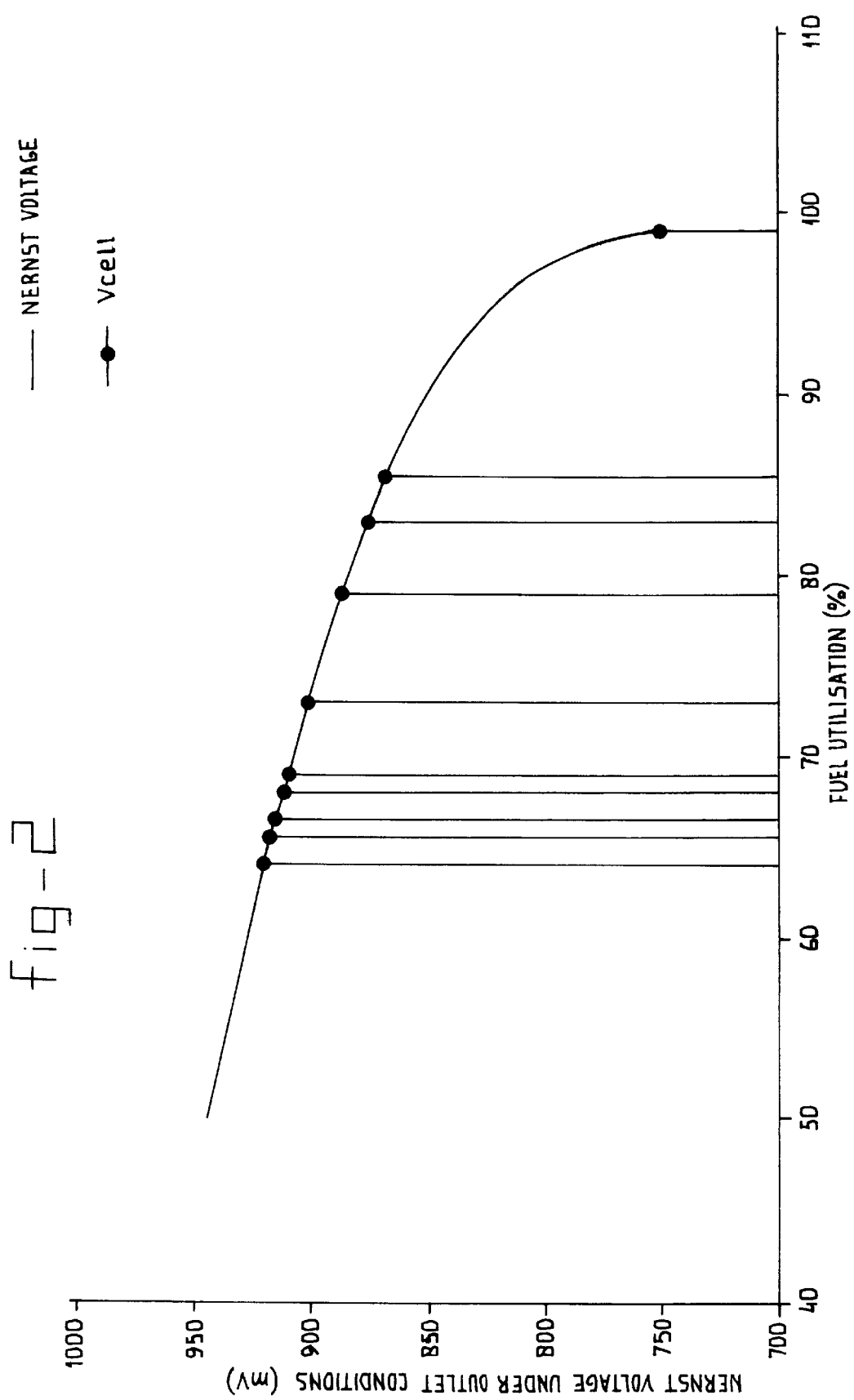
FIG. 2 shows the relationship between the Nernst voltage at the outlet and the utilisation of a reactant.

In FIG. 2 the Nernst voltage at constant oxidant utilisation (10%) is plotted against the fuel utilisation for the cell stack described above. The temperature for which the various parameters were determined is 634° C. It can be seen that with increasing fuel utilisation the sensitivity to the change in Nernst voltage increases.

In FIG. 2 the points shown are measurement points in a 10-cell stack. It can be seen from this figure that there is an appreciable spread in fuel utilisation and thus in the flow rates of the reactant concerned.

It can be seen from the above that, on the basis of the insight given above, it is possible to determine ingoing flow ratios in a fuel cell stack in a particularly simple manner. It is self-evident that this method can be used for all other determinations obvious to a person skilled in the art after reading the above. Such determinations are considered to fall within the scope of the appended claims.

What is claimed is:

1. Method for determining the utilization of a reactant at an anode side or a cathode side of an electrochemical cell, which comprises:

feeding through a first flow reactant at one of the cathode or anode side;

feeding through a second flow reactant at the other of said anode or cathode sides, said first flow being higher than said second flow;

setting a low average current density in the electrochemical cell;

determining the cell voltage;

compiling a table in which the temperature relationship between the Nernst voltage under outlet conditions of said cell and the utilization of the second flow reactant is incorporated;

equating the Nernst voltage and the cell voltage; and determining the utilization from the table.

2. The method according to claim 1, wherein the first flow reactant has a flow with an utilization of less than 25% at the set current density.

3. The method according to claim 2, wherein the first flow reactant has a flow with an utilization of less than 10% at the set current density.

4. The method according to claim 1, wherein the second flow reactant has a flow with an utilization greater than 50% at the set current density.

5. The method according to claim 4, wherein the second flow reactant has a flow with an utilization greater than 75% at the set current density.

6. The method according to claim 1, wherein the product of the average current density and local electrical resistance is less than 0.08 V, and wherein the current density at the outlet is less than 10 A/m².

7. The method according to claim 6, wherein the product of the average current density and local electrical resistance is 0.03 V.

8. The method according to claim 1, wherein the step of compiling the table further comprises correcting the Nernst voltage for the utilization of the first flow reactant.

9. Method for determining an ingoing flow rate of a reactant of an electrochemical cell, comprising determining the utilization in accordance with claim 1, and determining an inverse proportional utilization.

10. Method according to claim 9, wherein the step of determining the inverse proportional utilization further comprises multiplying by the set electric current and dividing by the Faraday constant (F=96485 C/mol), the number of electrons involved in a specific reaction equation and a molecular fraction in the reactant for which the utilization has been determined.

11. Method for determining the distribution of ingoing flow in a plurality of anode and/or cathode channels in a cell stack, comprising determining, under the conditions of claim 1, the utilization of each of the anode or cathode reactants, and determining a ratio of the inverse proportional utilization.

12. Method for determining an outgoing flow rate, comprising determining the ingoing flow rate in accordance with claim 9, and introducing a correction of the degree of conversion of the reactant as a function of the set current.

* * * * *